(12) United States Patent
Lucas et al.

(10) Patent No.: US 11,420,626 B2
(45) Date of Patent: Aug. 23, 2022

(54) METHOD FOR OPERATING A VEHICLE, AND CONTROL UNIT

(71) Applicant: Robert Bosch GmbH, Stuttgart (DE)

(72) Inventors: Bernhard Lucas, Walldorf (DE); Sebastian Baier, Munich (DE); Thorsten Schori, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 16/772,752

(22) PCT Filed: Apr. 27, 2019

(86) PCT No.: PCT/EP2019/060832
§ 371 (c)(1),
(2) Date: Jun. 12, 2020

(87) PCT Pub. No.: WO2019/242914
PCT Pub. Date: Dec. 26, 2019

(65) Prior Publication Data
US 2021/0162999 A1 Jun. 3, 2021

(30) Foreign Application Priority Data

Jun. 21, 2018 (DE) .......................... 102018210074.8
Jul. 24, 2018 (DE) .......................... 102018212296.2

(51) Int. Cl.
| | | |
|---|---|---|
| *B60W 30/16* | (2020.01) | |
| *B60W 60/00* | (2020.01) | |
| *B60W 40/08* | (2012.01) | |
| *B60W 50/08* | (2020.01) | |
| *B60W 50/10* | (2012.01) | |

(52) U.S. Cl.
CPC ............ *B60W 30/16* (2013.01); *B60W 40/08* (2013.01); *B60W 50/087* (2013.01); *B60W 50/10* (2013.01); *B60W 60/001* (2020.02); *B60W 2540/10* (2013.01); *B60W 2540/12* (2013.01)

(58) Field of Classification Search
None
See application file for complete search history.

(56) References Cited

U.S. PATENT DOCUMENTS

| | | | | | |
|---|---|---|---|---|---|
| 6,058,347 | A | * | 5/2000 | Yamamura | ............ B60W 10/04 303/193 |
| 7,280,903 | B2 | * | 10/2007 | Arai | ...................... B60W 30/16 340/436 |

(Continued)

FOREIGN PATENT DOCUMENTS

| | | |
|---|---|---|
| DE | 102007031543 A1 | 1/2009 |
| JP | H10318009 A | 12/1998 |

(Continued)

OTHER PUBLICATIONS

International Search Report for PCT/EP2019/060832, dated Jul. 25, 2019.

*Primary Examiner* — Jonathan M Dager
(74) *Attorney, Agent, or Firm* — Norton Rose Fulbright US LLP; Gerard Messina

(57) ABSTRACT

A method for operating a vehicle. When an autonomous cruise control is in the activated state, a switch is made to an accelerator-pedal-controlled distance controller in response to an acceleration command indicated by an override of an accelerator pedal of the vehicle.

6 Claims, 2 Drawing Sheets

(56) References Cited

U.S. PATENT DOCUMENTS

| | | | |
|---|---|---|---|
| 7,359,788 B2* | 4/2008 | Arai | B60K 31/0008 |
| | | | 701/96 |
| 8,010,274 B2* | 8/2011 | Sawada | B60T 7/22 |
| | | | 701/79 |
| 9,050,982 B2* | 6/2015 | Pietron | B60W 50/085 |
| 9,162,677 B2* | 10/2015 | Sekine | B60W 30/143 |
| 9,656,550 B2* | 5/2017 | Min | B60W 30/143 |
| 9,701,292 B2* | 7/2017 | Fairgrieve | F16H 61/0213 |
| 10,766,488 B2* | 9/2020 | Tokimasa | G06V 20/58 |
| 2002/0133285 A1* | 9/2002 | Hirasago | B60K 35/00 |
| | | | 701/96 |
| 2004/0195022 A1* | 10/2004 | Inoue | B60W 30/16 |
| | | | 180/170 |
| 2012/0065863 A1* | 3/2012 | Takagi | B60W 30/16 |
| | | | 701/96 |
| 2017/0001642 A1* | 1/2017 | Kumai | B60W 50/087 |
| 2021/0146893 A1* | 5/2021 | Schori | B60T 8/17 |

FOREIGN PATENT DOCUMENTS

| | | |
|---|---|---|
| JP | 2010143323 A | 7/2010 |
| JP | 2011016496 A | 1/2011 |

* cited by examiner

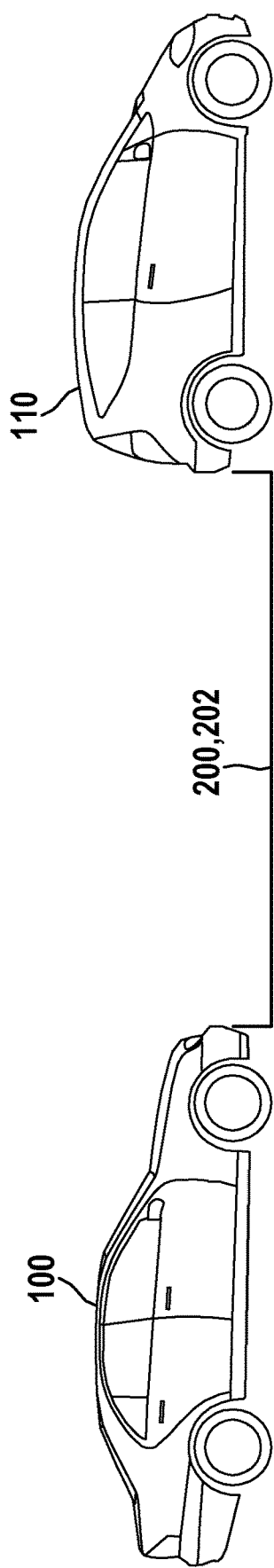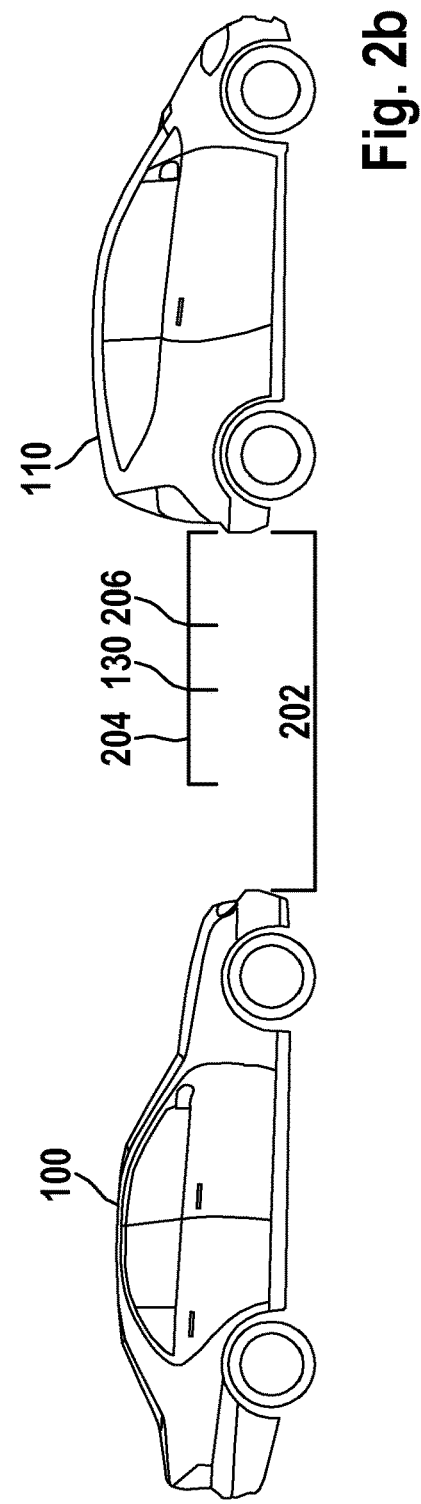

METHOD FOR OPERATING A VEHICLE, AND CONTROL UNIT

FIELD

The present invention relates to a method for operating a vehicle and a control unit for a vehicle.

BACKGROUND INFORMATION

In a vehicle having an autonomous cruise control, engine power output is regulated in such a way that a set desired speed is maintained. In addition, the engine power output is regulated in such a way that a situation-dependent desired distance from a preceding vehicle is maintained. If a driver of the vehicle overrides the autonomous cruise control by operating an accelerator pedal of the vehicle, the engine power output is increased in accordance with an angular position of the accelerator pedal. If the driver steps on a brake pedal of the vehicle, the autonomous cruise control is deactivated.

SUMMARY

The present invention includes a method for operating a vehicle and a control unit for a vehicle, as well as a corresponding computer-program product and a machine-readable storage medium. Advantageous further developments of and improvements to the present invention are described herein.

Specific embodiments of the present invention advantageously make it possible to prevent running into a preceding vehicle from behind, even in the event an autonomous cruise control of a vehicle is overridden.

In accordance with the present invention, an example method is provided for operating a vehicle which includes that, when the autonomous cruise control is in the activated state, a switch is made to an accelerator-pedal-controlled distance controller in response to an acceleration command indicated by an override of an accelerator pedal of the vehicle.

Other specific embodiments of the present invention may be regarded, inter alia, as based on the description below.

An autonomous cruise control may be understood to be a regulator in a control unit of a vehicle, which adjusts a power-output setpoint value for a drive of the vehicle as a function of an instantaneous speed of the vehicle and as a function of a present distance from a preceding vehicle. The preceding vehicle may be referred to as other vehicle.

The power-output setpoint value is adjusted by the autonomous cruise control until the instantaneous speed reaches a set desired speed. If the speed corresponds essentially to the desired speed, the autonomous cruise control adjusts the power-output setpoint value in such a way that the speed remains within a set speed tolerance range around the desired speed. If the speed is less than the desired speed, the power-output setpoint value is raised. If the speed is greater than the desired speed, the power-output setpoint value is reduced. The speed is kept within the speed tolerance range so long as the present distance from a preceding vehicle is greater than a predetermined, speed-dependent desired distance. If the distance corresponds essentially to the desired distance, the power-output setpoint value is regulated by the autonomous cruise control so that the distance remains within a distance tolerance range. If the distance is greater than the desired distance, the power-output setpoint value is raised. If the distance is smaller than the desired distance, the power-output setpoint value is reduced. If the distance diminishes faster than can be offset by the reduced power-output setpoint value, a brake system of the vehicle is activated in order to increase the distance again to the desired distance. The distance may be expressed by a speed-independent timeslot, since a distance traveled per unit of time is dependent on the speed.

An acceleration command by a driver of the vehicle is detected via an accelerator pedal of the vehicle. In this context, an override of the accelerator pedal is recognized if, for example, an instantaneous angle of the accelerator pedal is greater than an angle which corresponds to the power-output setpoint value set at the moment by the autonomous cruise control.

An accelerator-pedal-controlled distance controller may be a controller in the control unit. The distance controller translates the acceleration command into the power-output setpoint value as a function of the present distance. In this context, a change of the acceleration command is translated into a change of the power-output setpoint value depending on the present distance. The closer the present distance is to a target-value distance, the smaller the change of the power-output setpoint value becomes. If the other vehicle decelerates and as a consequence, the target-value distance is not maintained, the acceleration command is reduced and, if necessary, a brake system of the vehicle is triggered to likewise decelerate the vehicle. The power-output setpoint value may also be reduced if the ego vehicle is approaching another vehicle without a change of the acceleration command (acceleration command=0), in order to maintain the target-value distance. (Example: Ego vehicle is traveling at 150 km/h or accelerating and is coming closer with a constant accelerator-pedal angle to a vehicle that is traveling 120 km/h). The target-value distance may be less than the desired distance.

In response to an end of the acceleration command, a switch may be made from the accelerator-pedal-controlled distance-control mode back again to the use of the autonomous cruise control. Thus, the vehicle is able to travel again with the desired speed and the desired distance to the other vehicle, respectively, as soon as the driver removes his foot from the accelerator pedal.

A change may be made to the accelerator-pedal-controlled distance controller in response to a deceleration demand via operation of a brake pedal of the vehicle. Thus, the distance continues to be monitored after the braking procedure, and if the distance decreases toward the target-value distance or falls below the target-value distance, the acceleration command is reduced and, if necessary, an automatic braking procedure is carried out in order to maintain a minimal distance.

In the accelerator-pedal-controlled distance-control mode, the target-value distance to the preceding vehicle may be adjusted as a function of the acceleration command. The target-value distance may be adjusted in timeslots. The smallest target-value distance corresponds to a minimal safety distance. The greater the acceleration command, the smaller the target-value distance may be set. A smaller distance may be set for passing maneuvers than for constant driving behind another vehicle on the turnpike.

For example, the example method may be implemented in software or hardware or in a mixed form of software and hardware, e.g., in a control unit.

The present invention also provides a control unit for a vehicle which is designed to carry out, control or implement the steps of a variant of the method presented here, in suitable devices.

The control unit may be an electrical device having at least one arithmetic logic unit for processing signals or data, at least one memory unit for storing signals or data, and at least one interface and/or a communication interface for the read-in or output of data which are embedded in a communication protocol. For example, the arithmetic logic unit may be a signal processor, what is referred to as a system ASIC or a microcontroller for processing sensor signals and outputting data signals as a function of the sensor signals. The memory unit may be a flash memory, for example, an EPROM or a magnetic memory unit. The interface may take the form of a sensor interface for reading in the sensor signals from a sensor and/or an actuator interface for the output of data signals and/or control signals to an actuator. The communication interface may be adapted to read in or output data in wireless and/or line-conducted fashion. The interfaces may also be software modules which are present in a microcontroller, for example, in addition to other software modules.

Of advantage, in accordance with the present invention, is also a computer-program product or computer program having program code that may be stored on a machine-readable data carrier or storage medium such as a semiconductor memory, a hard disk memory or an optical memory and is used to carry out, implement and/or control the steps of the method according to one of the specific embodiments described above, especially when the program product or program is executed on a computer or a device.

It is pointed out that some of the possible features and advantages of the present invention are described herein with reference to different specific embodiments. One skilled in the art will recognize that the features of the control unit and of the method may be combined, adapted or exchanged in suitable manner, in order to arrive at further specific embodiments of the present invention.

BRIEF DESCRIPTION OF THE DRAWINGS

Specific embodiments of the present invention are described hereinafter with reference to the figures, neither the figures nor the description herein to be interpreted as restrictive of the present invention.

FIGS. 2a and 2b show representations of a vehicle behind another vehicle while using an autonomous cruise control and an accelerator-pedal-controlled distance controller according to one exemplary embodiment of the present invention.

Figure 1:
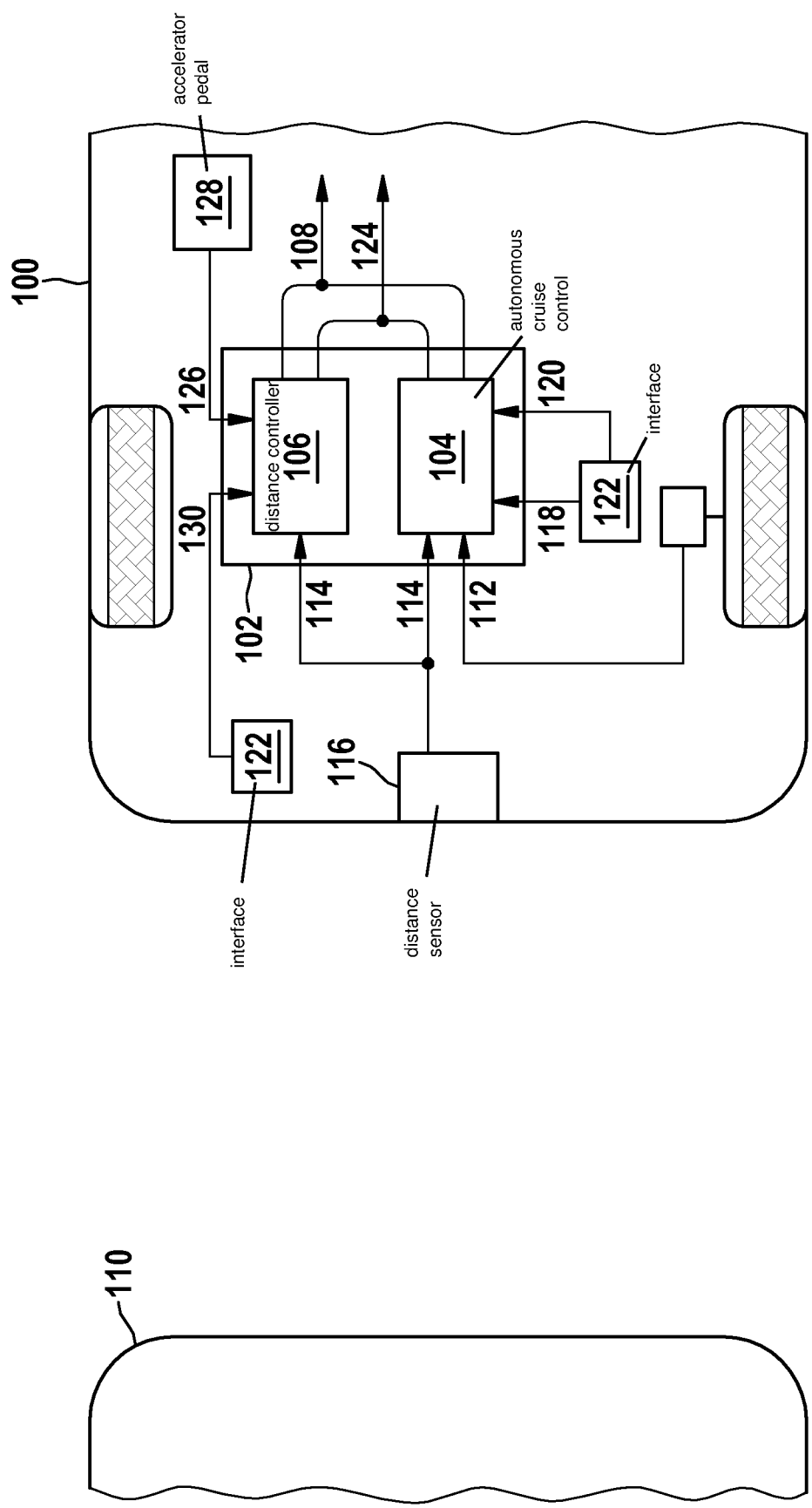
FIG. 1 shows a representation of a vehicle having a control unit according to one exemplary embodiment of the present invention.

The figures are merely schematic and not true to scale.

Identical reference numerals denote features that are identical or exercise essentially similar effects in the figures.

DETAILED DESCRIPTION OF EXAMPLE EMBODIMENTS

Presently, there are various driver assistance functions in vehicles. Cruise Control (CrCtl), Longitudinal Limiter (LLim), Advanced Longitudinal Limiter (ALLim) and Adaptive Cruise Control (ACC), among others, provide increased comfort and more safety for the driver. Moreover, further assistance functions improve safety through distance alarms and emergency-brake interventions.

The ACC functionality is designed to be more cautious in certain situations than some drivers themselves would drive. In these situations, utilizing a conventional system, the driver has the option of demanding more torque via the accelerator pedal than does the ACC function. The result, however, is that the conventional ACC function is inactive (override status) and does not brake for objects in front. For example, in the case of a passing maneuver on the freeway, due to an override via the accelerator pedal, braking by the vehicle to be passed is not taken into account and the ego vehicle therefore does not brake.

In accordance with example embodiments of the present invention, the existing ACC function is augmented by a Dynamic Distance/Drive Assist (DDA) having a distance buffer and/or speed buffer adapted dynamically to the driver command.

In accordance with the present invention, the DDA function is utilized in the case of the override. Thus, the driver has the capability to accelerate, but is still protected by the maintenance of a desired distance in the event of a braking procedure by the vehicle to be passed. In this context, the DDA may be set to a small time gap or may adjust the desired distance continuously in response to the accelerator-pedal input. In the latter case, the driver is scarcely/not restricted during a desired acceleration via the accelerator pedal, but is braked or protected in the event the preceding vehicle brakes.

FIG. 1 shows a representation of a vehicle 100 having a control unit 102 according to one exemplary embodiment. An autonomous cruise control 104 and a distance controller 106 are implemented in control unit 102. Control unit 102 may have additional functions not described here.

Autonomous cruise control 104 is a regulator for a power-output setpoint value 108 of vehicle 100. Power-output setpoint value 108 represents a power output to be delivered by a drive of vehicle 100. When autonomous cruise control 104 is active, it regulates the power supplied as a function of an instantaneous speed of vehicle 100 and a present distance between the vehicle and a preceding vehicle 110.

To that end, autonomous cruise control 104 reads in a speed value 112 and a distance value 114. Speed value 112 represents the instantaneous speed. Distance value 114 represents the present distance from preceding vehicle 110. The present distance is measured by a distance sensor 116 of vehicle 100.

In addition, autonomous cruise control 104 reads in a desired speed value 118 and a desired distance value 120. Desired speed value 118 represents a desired speed of the vehicle and is set by a driver of vehicle 100 via an interface 122. Desired distance value 120 represents a desired distance from preceding vehicle 110. Desired distance value 120 is likewise set by the driver via interface 122 or via a further interface not shown here.

The desired distance is a function of speed. The desired distance is larger at greater speed than at lower speed. Therefore, desired distance value 120 may be read in as a time gap which is independent of speed. The time gap describes a length of time until vehicle 100 passes over the same point as preceding vehicle 110 passed over previously.

Autonomous cruise control 104 increases power-output setpoint value 108 if the speed of vehicle 100 is less than the desired speed. Conversely, power-output setpoint value 108 is reduced if the speed is greater than the desired speed. In addition, power-output setpoint value 108 is reduced if the distance is smaller than the desired distance. As a consequence, the speed decreases. So long as the speed is less than the desired speed, power-output setpoint value 108 is increased if the distance is greater than the desired distance.

If the distance becomes less than the desired distance, e.g., because preceding vehicle 110 is braking, autonomous cruise control 104 outputs a braking setpoint value 124 for a brake system of vehicle 100, in order to brake vehicle 100 until the distance agrees again with the desired distance.

Distance controller 106 is likewise a controller for power-output setpoint value 108. When distance controller 106 is active, it controls the delivered power output depending on the distance and an acceleration command of the driver. The acceleration command is represented by an accelerator-pedal angle 126 of an accelerator pedal 128 of vehicle 100. The acceleration command is translated into power-output setpoint value 108, utilizing the distance.

To that end, distance controller 106 reads in a target-value distance 130. Target-value distance 130 represents a minimum distance which is preset by the driver at interface 122 or another interface not shown.

The minimum distance is a function of speed. The minimum distance is larger at greater speed than at lower speed. Therefore, target-value distance 130 may likewise be read in as a time gap which is independent of speed. The minimum distance may be smaller than the desired distance.

So long as the present distance is outside of a buffer area before the minimum distance, the acceleration command is translated directly into power-output setpoint value 108. If the distance lies within the buffer area, the acceleration command is translated in reduced form into power-output setpoint value 108. The closer the distance is to the minimum distance, the less the acceleration command is translated into power-output setpoint value 108. If the distance corresponds to the minimum distance, distance controller 106 regulates power-output setpoint value 108 in such a way that there is no drop below the minimum distance.

If a reduction of power-output setpoint value 108 is not sufficient to achieve target-value distance 130, distance controller 106 outputs braking setpoint value 124 for the brake system of vehicle 100, in order to brake vehicle 100 until the distance agrees again with the minimum distance.

In one exemplary embodiment, the driver is able to influence the minimum distance. If the driver increases accelerator-pedal angle 126 so that it lies above a threshold value, or/and changes with an angular velocity that lies above a threshold value, the time gap corresponding to adjusted target-value distance 130 is reduced. In particular, the time gap is reduced stepwise. Minimally, the time gap may become as small as a total reaction time of the system.

When the driver signals a reduced acceleration command again via accelerator pedal 128, the time gap is enlarged again.

In the approach presented here, a switch is made from autonomous cruise control 104 to distance controller 106 when the driver, via accelerator pedal 128, sets an acceleration command which corresponds to a greater power-output setpoint value 108 than power-output setpoint value 108 output presently by autonomous cruise control 104. Thus, the driver is able to override autonomous cruise control 104 and accelerate the vehicle beyond the desired speed. The distance necessary from preceding vehicle 110 nevertheless continues to be monitored and in case of emergency, maintained by a braking intervention.

When the acceleration command corresponds again to a lower power-output setpoint value 108 than power-output setpoint value 108 output presently by autonomous cruise control 104, a change is made again from distance controller 106 to autonomous cruise control 104.

In one exemplary embodiment, a switch is made from autonomous cruise control 104 to distance controller 106 when the driver operates a brake pedal of vehicle 100. In this way, monitoring of the distance from preceding vehicle 110 is maintained, and vehicle 100 is already braked gently in response to a drop below set target-value distance 130, before a possibly existent emergency braking assistance system executes a hard braking intervention.

FIGS. 2a and 2b show representations of a vehicle 100 behind another vehicle 110 while using an autonomous cruise control and a distance controller according to one exemplary embodiment. The autonomous cruise control and the distance controller are implemented in a control unit of vehicle 100, as in FIG. 1.

In FIG. 2a, utilizing the autonomous cruise control, the vehicle is traveling with desired distance 200 behind other vehicle 110. The autonomous cruise control has adjusted the speed of vehicle 100 essentially to the speed of the other vehicle by controlling interventions into the drive power provided. A present distance 202 is held constant within a tolerance range around desired distance 200 at approximately constant speed.

In FIG. 2b, utilizing the distance controller, vehicle 100 is traveling with a smaller distance 202 from other vehicle 110. The driver has overridden the autonomous cruise control by stepping on the accelerator pedal and has deflected the accelerator pedal by a larger accelerator-pedal angle than corresponds to a power-output setpoint value provided at the moment by the autonomous cruise control. As a result, the control unit has switched from the autonomous cruise control to the distance controller.

During distance-control operation, the accelerator-pedal angle is translated into the power-output setpoint value until distance 202 lies within buffer area 204 around target-value distance 130. Within buffer area 204, the translation of the accelerator-pedal angle is increasingly reduced. In other words, the power-output setpoint value is reduced, even though the accelerator-pedal angle remains the same.

When distance 202 corresponds to target-value distance 130, the power-output setpoint value is reduced to the extent that vehicle 100 maintains target-value distance 130 to other vehicle 110.

If other vehicle 110 in the situation becomes slower or brakes, the power-output setpoint value is further reduced and, if necessary, the brake system of vehicle 100 is activated.

If the driver feels that preselected target-value distance 130 from other vehicle 110 is too great, he may then reduce target-value distance 130 by operating the accelerator pedal. In so doing, the target-value distance may be reduced to the extent that vehicle 100 maintains only a speed-dependent safety distance 206 from other vehicle 110.

Finally, it should be pointed out that terms such as "having," "including," etc. do not rule out other elements or steps, and terms such as "one" or "a" do not exclude multiplicity.

What is claimed is:

1. A method for operating a vehicle, the method comprising:
    activating an autonomous cruise control; and
    switching, when the autonomous cruise control is in an activated state, to an accelerator-pedal-controlled distance controller in response to an acceleration command indicated by an override of an accelerator pedal of the vehicle;
    wherein the autonomous cruise control and the accelerator-pedal-controlled distance controller are in a control unit, wherein the autonomous cruise control is a regulator for a power-output setpoint value of the vehicle, wherein the power-output setpoint value represents a power output to be delivered by a drive of the vehicle, and when active, the autonomous cruise control regulates the power supplied as a function of an instantaneous speed of the vehicle and a present distance between the vehicle and a preceding vehicle, wherein the distance controller is a controller for the power-output setpoint value, wherein when active, the distance controller controls the delivered power output depending on the distance and an acceleration command of the driver, wherein the acceleration command is represented by an accelerator-pedal angle of an accelerator pedal of the vehicle, and wherein the acceleration command is translated into the power-output setpoint value, utilizing the distance, wherein the distance controller reads in a target-value distance, which represents a minimum distance that is preset at an interface, wherein so long as a present distance is outside of a buffer area before the minimum distance, the acceleration command is translated directly into the power-output setpoint value, wherein if the distance lies within the buffer area, the acceleration command is translated in a reduced form into the power-output setpoint value, wherein when the distance is closer to the minimum distance, the less the acceleration command is translated into the power-output setpoint value, and wherein when the distance corresponds to the minimum distance, the distance controller regulates power-output setpoint value so that there is no drop below the minimum distance, and wherein when a reduction of the power-output setpoint value is not sufficient to achieve the target-value distance, the distance controller outputs the braking setpoint value for a brake system of the vehicle to brake the vehicle until the distance is the same as the minimum distance.

2. The method as recited in claim 1, further comprising:
switching, in response to an end of the acceleration command, from the accelerator-pedal-controlled distance controller back to use of the autonomous cruise control.

3. The method as recited in claim 1, further comprising:
switching to the accelerator-pedal-controlled distance controller in response to a deceleration demand via operation of a brake pedal of the vehicle.

4. The method as recited in claim 1, wherein during use of the accelerator-pedal-controlled distance controller, the target-value distance from a preceding vehicle is adjusted as a function of the acceleration command.

5. A control apparatus for operating a vehicle, comprising:
a control unit configured to switch, when an autonomous cruise control is in an activated state, to an accelerator-pedal-controlled distance controller in response to an acceleration command indicated by an override of an accelerator pedal of the vehicle;
wherein the autonomous cruise control and the accelerator-pedal-controlled distance controller are in the control unit,
wherein the autonomous cruise control is a regulator for a power-output setpoint value of the vehicle, wherein the power-output setpoint value represents a power output to be delivered by a drive of the vehicle, and when active, the autonomous cruise control regulates the power supplied as a function of an instantaneous speed of the vehicle and a present distance between the vehicle and a preceding vehicle, and wherein the distance controller is a controller for the power-output setpoint value, wherein when active, the distance controller controls the delivered power output depending on the distance and an acceleration command of the driver, wherein the acceleration command is represented by an accelerator-pedal angle of an accelerator pedal of the vehicle, and wherein the acceleration command is translated into the power-output setpoint value, utilizing the distance, wherein the distance controller reads in a target-value distance, which represents a minimum distance that is preset at an interface, wherein so long as a present distance is outside of a buffer area before the minimum distance, the acceleration command is translated directly into the power-output setpoint value, wherein if the distance lies within the buffer area, the acceleration command is translated in a reduced form into the power-output setpoint value, wherein when the distance is closer to the minimum distance, the less the acceleration command is translated into the power-output setpoint value, and wherein when the distance corresponds to the minimum distance, the distance controller regulates power-output setpoint value so that there is no drop below the minimum distance, and wherein when a reduction of the power-output setpoint value is not sufficient to achieve the target-value distance, the distance controller outputs the braking setpoint value for a brake system of the vehicle to brake the vehicle until the distance is the same as the minimum distance.

6. A non-transitory machine-readable storage medium, on which is stored a computer program, which is executable by a processor, comprising:
a program code arrangement having program code for operating a vehicle, by performing the following:
switching, when an autonomous cruise control is in an activated state, to an accelerator-pedal-controlled distance controller in response to an acceleration command indicated by an override of an accelerator pedal of the vehicle;
wherein the autonomous cruise control and the accelerator-pedal-controlled distance controller are in the control unit,
wherein the autonomous cruise control is a regulator for a power-output setpoint value of the vehicle, wherein the power-output setpoint value represents a power output to be delivered by a drive of the vehicle, and when active, the autonomous cruise control regulates the power supplied as a function of an instantaneous speed of the vehicle and a present distance between the vehicle and a preceding vehicle, and wherein the distance controller is a controller for the power-output setpoint value, wherein when active, the distance controller controls the delivered power output depending on the distance and an acceleration command of the driver, wherein the acceleration command is represented by an accelerator-pedal angle of an accelerator pedal of the vehicle, and wherein the acceleration command is translated into the power-output setpoint value, utilizing the distance, wherein the distance controller reads in a target-value distance, which represents a minimum distance that is preset at an interface, wherein so long as a present distance is outside of a buffer area before the minimum distance, the acceleration command is translated directly into the power-output setpoint value, wherein if the distance lies within the buffer area, the acceleration command is translated in a reduced form into the power-output setpoint value, wherein when the distance is closer to the minimum distance, the less the acceleration command is translated into the power-output setpoint value, and wherein when the distance corresponds to the minimum distance, the distance controller regulates power-output setpoint value so that there is no drop below the minimum distance, and wherein when a reduction of the power-output setpoint value is not sufficient to achieve the target-value distance, the distance controller outputs the braking setpoint value for a brake system of the vehicle to brake the vehicle until the distance is the same as the minimum distance.

* * * * *